US005346338A

United States Patent [19]

Wang

[11] Patent Number: 5,346,338

[45] Date of Patent: Sep. 13, 1994

[54] METHOD FOR FORMING WORKING FLUID PASSAGES IN A BASE OF A HYDRAULIC JACK

[76] Inventor: Ta C. Wang, No. 269, Sec. 2, An Ho Rd., Tainan, Taiwan

[21] Appl. No.: 63,793

[22] Filed: May 20, 1993

[51] Int. Cl.[5] .............................................. B23B 35/00

[52] U.S. Cl. .................................................... 408/1 R

[58] Field of Search ........................................ 408/1 R

*Primary Examiner*—Daniel W. Howell

*Attorney, Agent, or Firm*—Kenyon & Kenyon

[57] ABSTRACT

A method for forming working fluid passages in a base of a hydraulic jack includes the steps of: (1) forming a supporting rod seat passage by drilling from a lower portion of a check valve seat on the base to communicate with the chamber defined in a lower portion of a supporting rod seat on the base; (2) forming a first connecting passage by drilling from a side surface of a pressure relieve seat on the base to communicate with the supporting rod seat passage; (3) forming a pressure relieve passage by drilling from the side surface of the relieve seat to communicate with the supporting rod seat passage, the pressure relieve passage is substantially parallel to the first connecting passage and disposed between the first connecting passage and the chamber; (4) forming a second connecting passage by drilling from a second side of the pressure relieve seat to communicate with the pressure relieve passage, the first connecting passage transversely communicates with the second connecting passage; (5) forming a main passage by drilling from a lower portion of a reservoir seat on the base to communicate with the lower portion of the check valve seat; and (6) forming an outlet passage by drilling from a top surface of the reservoir seat downward to communicate with the main passage.

1 Claim, 3 Drawing Sheets

METHOD FOR FORMING WORKING FLUID PASSAGES IN A BASE OF A HYDRAULIC JACK

BACKGROUND OF THE INVENTION

The present invention relates to a novel method for forming working fluid passages in a base of a hydraulic jack.

Hydraulic jacks are common and useful vehicle accessories. Manufacturing of the base of the hydraulic jack, which is generally accomplished by molding and/or electric discharge machining to form required passages therein through which the working fluid flows, is cumbersome and expensive.

Therefore, there has been a long and unfulfilled need for a rapid and inexpensive method for forming the passages in a base of a hydraulic jack.

SUMMARY OF THE. INVENTION

The present invention provides a novel method for rapidly and inexpensively forming the passages in a base of a hydraulic jack, comprising the steps of:

(1) forming a supporting rod seat passage by drilling from a lower portion of a check valve seat on the base to communicate with the chamber defined in a lower portion of a supporting rod seat on the base;

(2) forming a first connecting passage by drilling from a side surface of a pressure relieve seat on the base to communicate with the supporting rod seat passage;

(3) forming a pressure relieve passage by drilling from the side surface of the relieve seat to communicate with the supporting rod seat passage, the pressure relieve passage is substantially parallel to the first connecting passage and disposed between the first connecting passage and the chamber;

(4) forming a second connecting passage by drilling from a second side of the pressure relieve seat to communicate with the pressure relieve passage, the first connecting passage transversely communicates with the second connecting passage;

(5) forming a main passage by drilling from a lower portion of a reservoir seat on the base to communicate with the lower portion of the check valve seat; and (6) forming an outlet passage by drilling from a top surface of the reservoir seat downward to communicate with the main passage.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
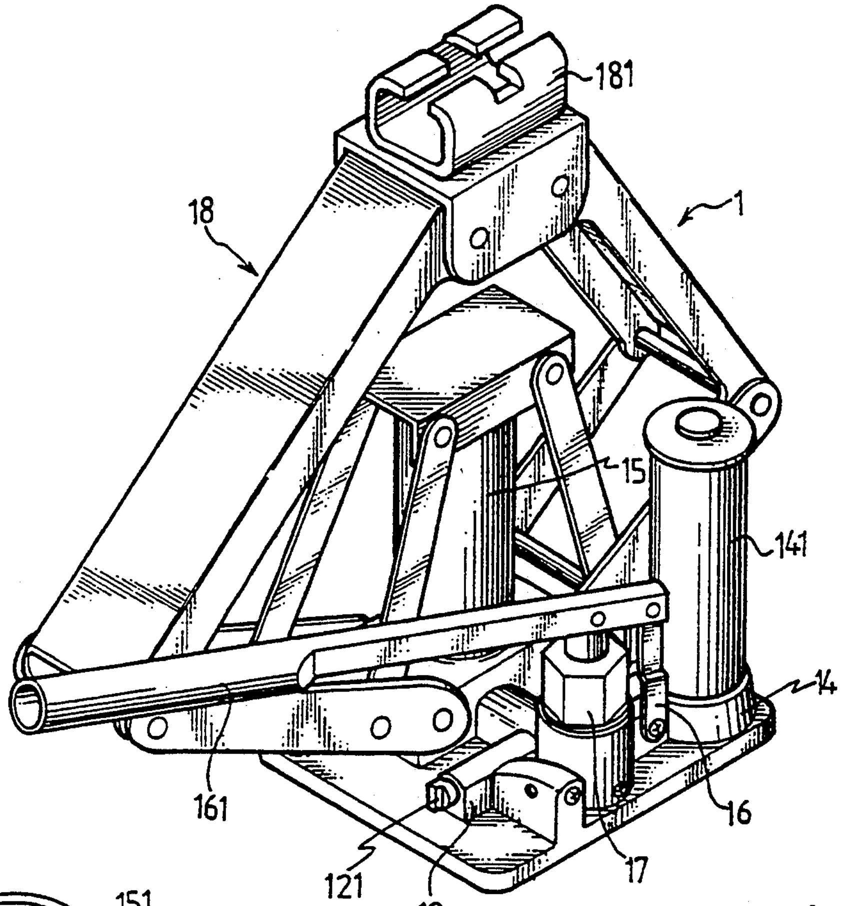
FIG. 1 is a perspective view of a hydraulic jack.
Figure 2:
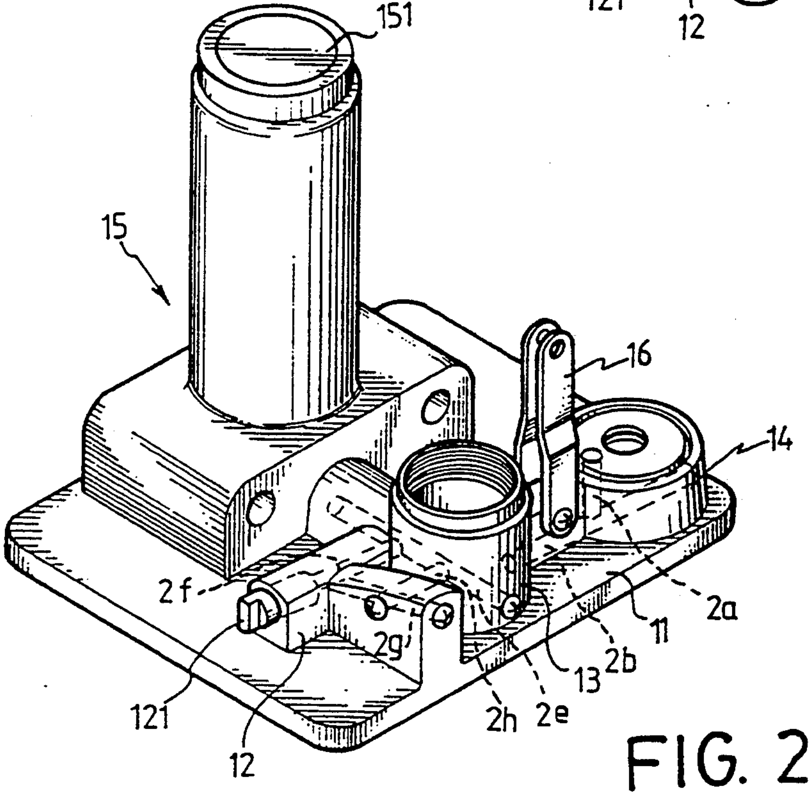
FIG. 2 is a perspective view of a base of the hydraulic jack in FIG. 1.
Figure 3:
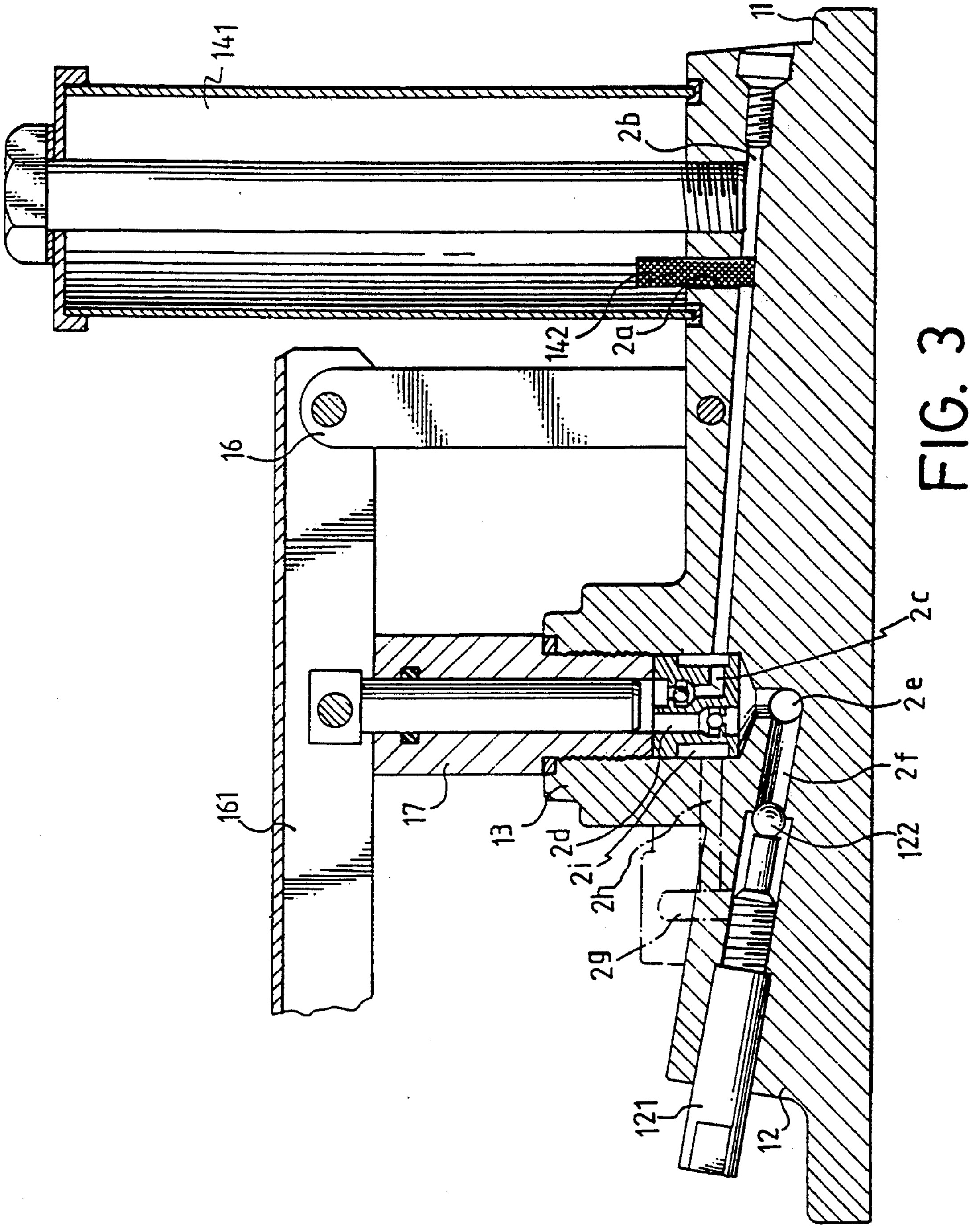
FIG. 3 is a cross-sectional view showing the passages in the base.
Figure 4:
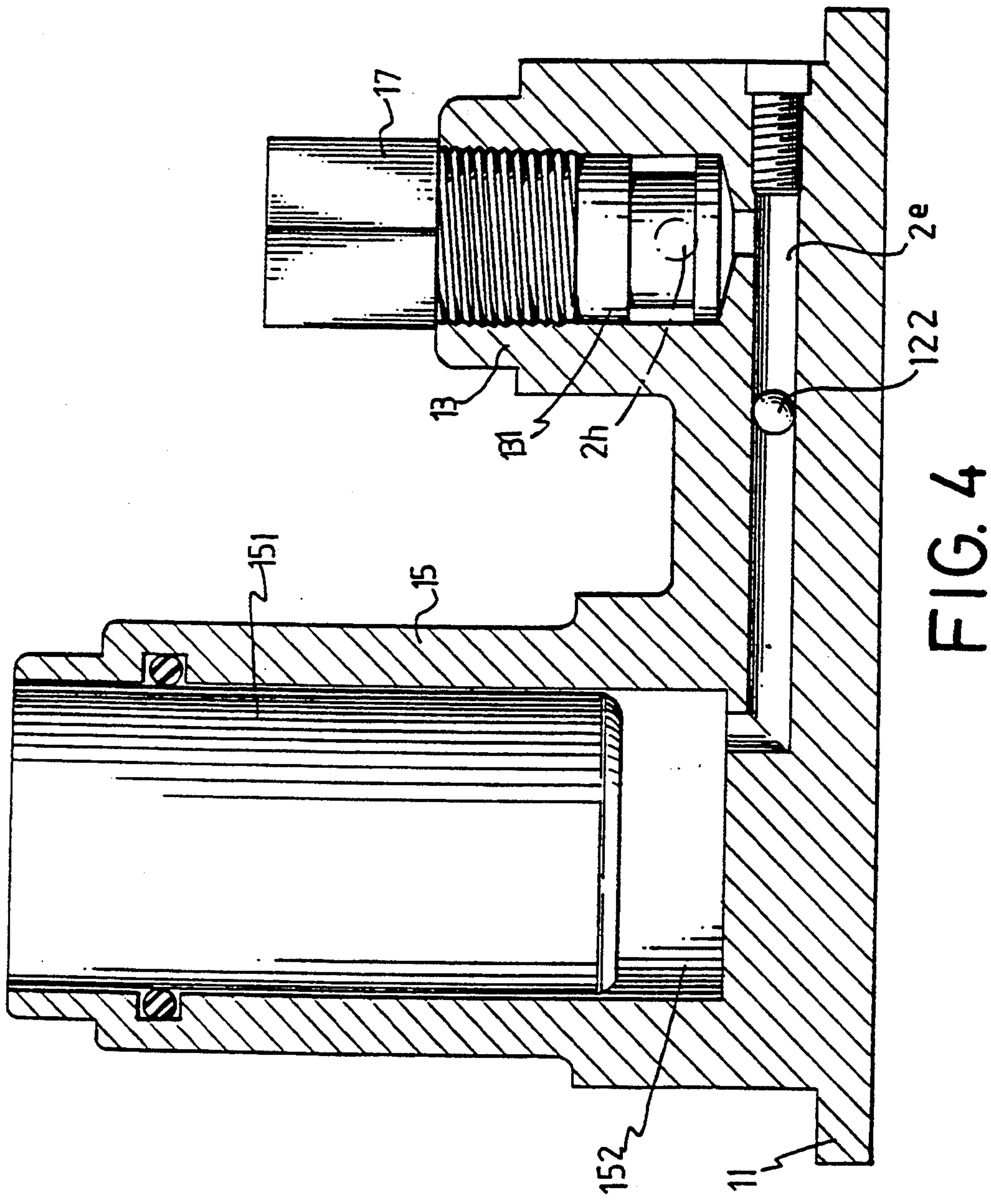
FIG. 4 is another cross-sectional view showing the passages near the supporting rod seat of the hydraulic jack.

Referring to FIGS. 1 and 2, a hydraulic jack 1 generally includes a base 11 which includes a pressure relieve seat 12, a check valve seat 13, a reservoir seat 14, and a supporting rod seat 15 integrally formed thereon. Still referring to FIGS. 1 and 2, and further to FIGS. 3 and 4, when the lever 161 on the bracket 16 is operated, the working fluid in the reservoir 141 above the reservoir seat 14 flows via the outlet passage *2a* of the reservoir 141, passage *2b*, two connecting passages *2c* and *2d*, and a supporting rod seat passage *2e*, into the chamber 152 below the supporting rod 151 in the supporting rod seat 15. The supporting member 18 of the supporting means 18 may bear load when the supporting rod 151 moves upward. Filter means 142 may be provided in the outlet passage *2a* to remove undesired particles in the working fluid.

When the load is removed, a relieve screw 121 mounted to the open end of the relieve passage *2f* is rotated, such that the working fluid in the chamber 152 flows through the pressure relieve passage *2f*, the connecting passages *2g*, *2h*, and *2i*, the passage *2b*, and then returns into the reservoir 141. A ball 122 is disposed in front of the relieve screw 121 to seal the passages during operation of the lever 161 to lift articles, such as a car. Operation of the hydraulic jack is conventional and therefore will not be further described.

Conventionally, the base 11 is manufactured by molding and electric discharge machining to form the required passages therein but the procedure thereof is found cumbersome, time-consuming, and expensive. The present invention provides a novel method to rapidly and inexpensively form the passages. The method comprises the following steps:

(1) forming a supporting rod seat passage *2e* by drilling from a lower portion of the check valve seat 13 to communicate with the chamber 152;

(2) forming a first connecting passage *2h* by drilling from a side surface of the pressure relieve seat 12 to communicate with the supporting rod seat passage *2e*;

(3) forming a pressure relieve passage *2f* by drilling from the side surface of the pressure relieve seat to communicate with the supporting rod seat passage *2e*, the pressure relieve passage *2f* is substantially parallel to the first connecting passage *2h* and disposed between the first connecting passage *2h* and the chamber 152;

(4) forming a second connecting passage *2g* by drilling from a second side of the pressure relieve seat 12 to communicate with the pressure relieve passage *2f*, the first connecting passage *2h* transversely communicates with the second connecting passage *2g*;

(5) forming a main passage *2b* by drilling from a lower portion of the reservoir seat 14 to communicate with the lower portion of the check valve seat 13; and (6) forming an outlet passage *2a* by drilling from a top surface of the reservoir seat 14 downward to communicate with the main passage *2b*.

By means of the drilling sequence provided by the present invention, the passages in the base are rapidly and inexpensively formed.

Although the invention has been explained in relation to its preferred embodiment, it is to be understood that many other possible modifications and variations can be made without departing from the spirit and scope of the invention as hereinafter claimed.

I claim:

1. A method for forming working fluid passages in a base of a hydraulic jack which includes a pressure relieve seat, a check valve seat, a reservoir seat, and a supporting rod seat integrally formed thereon, the method includes the steps of:

(1) forming a supporting rod seat passage by drilling from a lower portion of the check valve seat to communicate with a chamber defined in a lower portion of the supporting rod seat;

(2) forming a first connecting passage by drilling from a side surface of the pressure relieve seat to communicate with the supporting rod seat passage;

(3) forming a pressure relieve passage by drilling from the side surface of the pressure relieve seat to communicate with the supporting rod seat passage, the pressure relieve passage is substantially parallel to the first connecting passage and disposed between the first connecting passage and the chamber;

(4) forming a second connecting passage by drilling from a second side of the pressure relieve seat to communicate with the pressure relieve passage, the first connecting passage transversely communicates with the second connecting passage;

(5) forming a main passage by drilling from a lower portion of the reservoir seat to communicate with the lower portion of the check valve seat; and (6) forming an outlet passage by drilling from a top surface of the reservoir seat downward to communicate with the main passage.

* * * * *